W. E. KENNER.
TURPENTINE GATHERING APPARATUS.
APPLICATION FILED JAN. 16, 1911.
1,025,985.
Patented May 14, 1912.
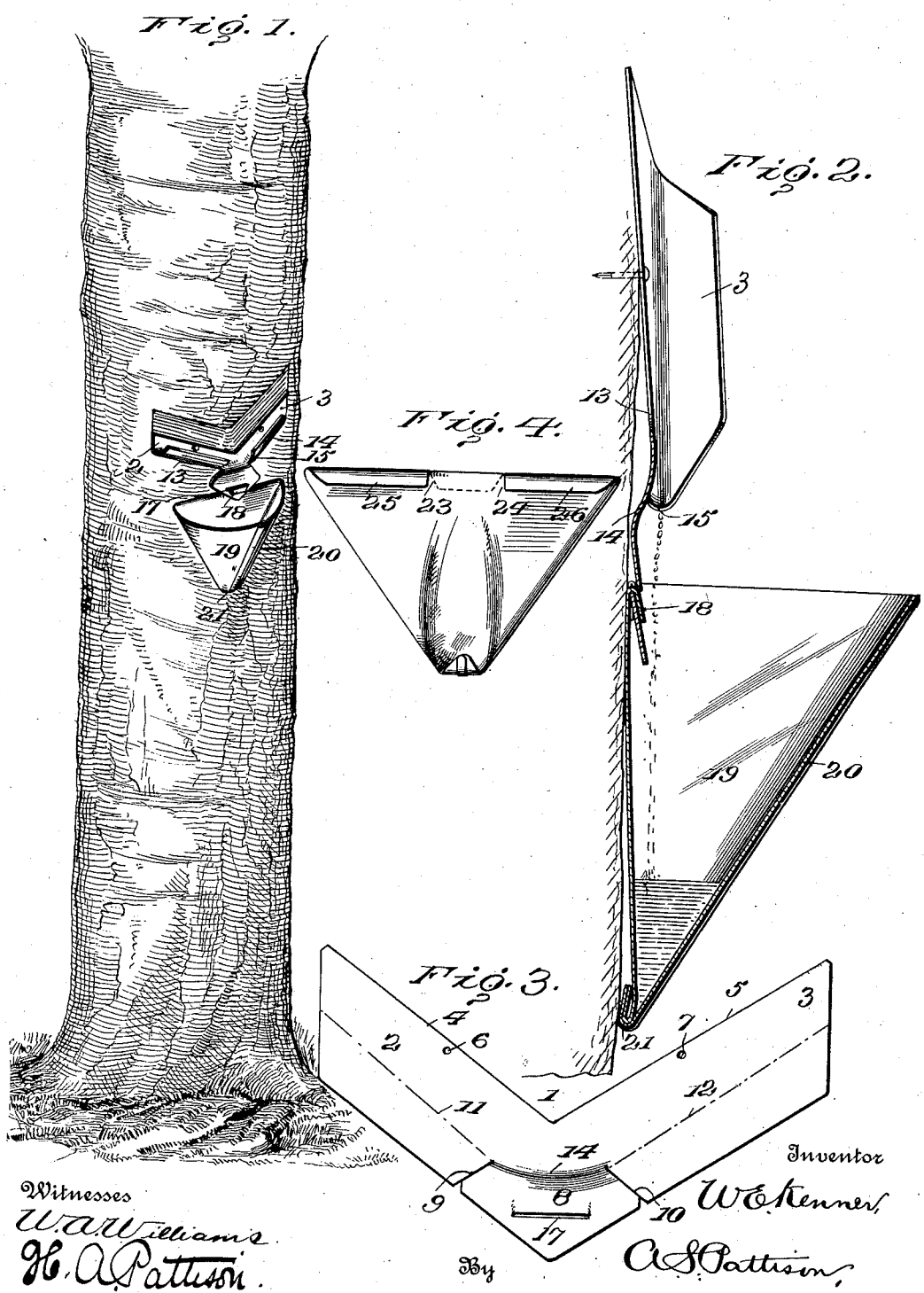

UNITED STATES PATENT OFFICE.

WILLIAM E. KENNER, OF BRUNSWICK, GEORGIA, ASSIGNOR OF ONE-SIXTH TO EDWARD H. MASON, ONE-SIXTH TO DAVID L. KELLER, AND ONE-SIXTH TO ALBERT FINDIG, ALL OF BRUNSWICK, GEORGIA.

TURPENTINE-GATHERING APPARATUS.

1,025,985.   Specification of Letters Patent.   Patented May 14, 1912.

Application filed January 16, 1911. Serial No. 603,033.

*To all whom it may concern:*

Be it known that I, WILLIAM E. KENNER, a citizen of the United States, residing at Brunswick, in the county of Glynn and State of Georgia, have invented certain new and useful Improvements in Turpentine-Gathering Apparatus, of which the following is a specification, reference being had therein to the accompanying drawing.

My invention relates to improvements in turpentine gathering apparatus.

The object of my invention is to provide an apparatus of this character in which the conductor and box are each made of single pieces of metal, bent and crimped into their respective form, thus forming a more simple, cheap and effective apparatus.

In the accompanying drawings: Figure 1 is a perspective view of a tree showing my invention applied thereto. Fig. 2 is a vertical sectional view. Fig. 3 is a plan view of the blank of which my conductor is formed. Fig. 4 is a rear elevation of the sap bucket.

Referring now to the drawings, 1 represents the blank of which my improved conductor is formed and, as shown, is formed with the two outwardly extending wings 2 and 3, which extend approximately at right angles to each other. This plate, as shown, is of comparatively narrow sheet metal and the two straight upper edges 4 and 5 of the wings 2 and 3, extend within the kerf of the tree and secured therein by means of nails or the like, passing through the openings 6 and 7.

As is understood by those skilled in the art of gathering turpentine, the tree is first nitched with an ax which cuts the grain of the tree and allows the turpentine to flow, and by the arrangement of the V or wedge-shaped kerf a greater number of grains of the wood are severed and thus cause a greater flow of turpentine.

The lower edge of the plate at the apex thereof, forms the spout 8 proper, which conveys the turpentine from the plate to the bucket, as will be hereinafter more fully described. The plate on each side of the portion 8 is provided with cuts 9 and 10, which converge upwardly and extend about half way through the plate. The wings 2 and 3 are bent on the lines 11 and 12 to form the portions 13 and 14, which are at an acute angle to the main body of the wings, so as to form the two troughs for conveying the turpentine downwardly and preventing it from running off of the plate.

The lines 11 and 12, as shown, converge slightly toward the edges 4 and 5, whereby the troughs have the lower ends at a greater angle than the edges of the members 2 and 3 to cause the sap to more readily run down to the troughs. The members or wings 2 and 3 are slightly curved to fit the tree snugly so as to receive all the sap from the tree. The upper edges 4 and 5 of the wings 2 and 3 are slightly drawn inwardly so that the lower edges as indicated at 13 are spaced slightly from the tree, as clearly shown in Fig. 2 of the drawings.

The portion 8 formed by the lower adjoining ends of the wings between the slits 9 and 10 is drawn inwardly on the curved line 14, so as to bring the portion 8 inwardly beyond the lower ends 15 of the troughs so that the sap as it passes from the troughs will pass directly into the sap bucket, as clearly shown in Fig. 2 of the drawings. The lower end of the portion 8, as indicated at 16, is bent outwardly to allow the bucket supporting member to pass under the said portion 8. The said flap or portion 8 is provided with a horizontal slot 17 into which hooks the tongue 18 carried by the bucket or receptacle 19. This bucket, as shown, is formed of a single sheet of metal crimped together as indicated at 20 to form a tight joint and is preferably of a conical form. The lower end, as indicated at 21, is crimped to form a tight joint. The upper edge 22 of the bucket is provided at the center with two V-shaped notches 23 and 24 and the portions on the outside of the notches are crimped outwardly as indicated at 25 and 26 to strengthen the upper edge of the receptacle. The upper edge between the notches 23 and 24 is bent inwardly forming the hook or tongue 18 which passes through the slot 17 from the under side.

As shown any sap that runs from the trough onto the portion 8 is conveyed to the bucket or receptacle as the same extends within the bucket.

Having thus described my invention, what I claim and desire to secure by Letters Patent is:

1. A turpentine conductor, comprising a sheet metal plate formed of two wings arranged at right angles to each other, the said wings on each side of the apex having a slit extending about half the width of the wings, the wings having laterally turned lower ends above the slits forming two converging troughs, and the portion between the slits bent inwardly to bring the same in beyond the lower ends of the trough, and having a horizontal slot to receive and support a bucket or receptacle.

2. A turpentine conductor comprising a sheet metal plate formed of two wings arranged at right angles to each other, the said wings on each side of the apex having a slit extending about half the width of the wings, the wings having laterally turned lower ends above the slits forming two converging troughs, having their edges slightly turned inwardly throwing the lower ends outwardly, and the upper end of the portion between the slits bent inwardly to bring it inwardly beyond the lower ends of the troughs and the lower end of said portion bent outward and having a horizontal slot to receive a hook for supporting a bucket or receptacle.

3. A turpentine conductor comprising a sheet metal plate formed of two wings at an angle to each other, means carried by the upper end for attaching it to the tree, the said wings on each side of the apex having a slit extending about half the width of the wings, the wings having laterally turned lower ends above the slit forming two converging troughs gradually decreasing in width toward their lower ends, and the lower end of said plate between the slits bent inwardly to bring it inwardly beyond the lower ends of the troughs and to hold the plate in an outwardly slanting position, and the lower end of the inwardly bent portion bent outward and having a slot to receive a hook for supporting a bucket below the trough.

4. A turpentine conductor, comprising a metal plate formed of two wings arranged at an angle to each other, means for attaching it to the tree, the said wings on each side of the apex having a slit extending inwardly at substantially right angles, the wings having laterally turned lower ends above the slit forming two converging troughs, and the lower end of said plate between the slits bent inwardly beyond the lower ends of the trough to engage the tree and hold the lower ends of the trough away from the tree.

In testimony whereof I hereunto affix my signature in the presence of two witnesses.

WILLIAM E. KENNER.

Witnesses:
 Thos. J. Kenner,
 E. C. Marlin.

---

Copies of this patent may be obtained for five cents each, by addressing the "Commissioner of Patents. Washington, D. C."